(12) United States Patent
Van Sprang

(10) Patent No.: US 7,453,190 B2
(45) Date of Patent: Nov. 18, 2008

(54) ELECTRIC LAMP WITH ABSORBING AND INTERFERENCE MEDIA

(75) Inventor: Hendrik Adrianus Van Sprang, Eindhoven (NL)

(73) Assignee: Koninklijke Philips Electronics, Eindhoven (NL)

( * ) Notice: Subject to any disclaimer, the term of this patent is extended or adjusted under 35 U.S.C. 154(b) by 513 days.

(21) Appl. No.: 10/504,760

(22) PCT Filed: Feb. 3, 2003

(86) PCT No.: PCT/IB03/00428

§ 371 (c)(1),
(2), (4) Date: Aug. 17, 2004

(87) PCT Pub. No.: WO03/071583

PCT Pub. Date: Aug. 28, 2003

(65) Prior Publication Data

US 2005/0105289 A1    May 19, 2005

(30) Foreign Application Priority Data

Feb. 22, 2002    (EP)    .................................. 02075718

(51) Int. Cl.
*H01J 5/16*    (2006.01)
*H01J 61/40*    (2006.01)
*H01K 1/26*    (2006.01)
*H01K 1/32*    (2006.01)

(52) U.S. Cl. ........................ 313/110; 313/112; 313/113; 313/635

(58) Field of Classification Search ......... 313/110–112, 313/635, 113
See application file for complete search history.

(56) References Cited

U.S. PATENT DOCUMENTS 6,661,164 B2 * 12/2003 Ruemmelin et al. .......... 313/112

FOREIGN PATENT DOCUMENTS

| JP | 585701 | 1/1983 |
| WO | WO0120641 | 3/2001 |
| WO | WO0146718 | 6/2001 |

OTHER PUBLICATIONS

Unpublished EP patent application 00204105.1 (PHNL000646), Apr. 20, 2001.

* cited by examiner

*Primary Examiner*—Karabi Guharay

(57) ABSTRACT

An electric lamp includes a lamp vessel which is transparent to visible light and accommodates a light source. The lamp vessel is covered with a combination of a light-absorbing medium and an optical interference film having layers of alternately layers of silicon dioxide and layers of a material with a comparatively high refractive index (e.g. $ZrO_2$). The reflection R of the interference film changes from $0.60 \leq R \leq 0.95$ to $0.40 \leq R \leq 0.65$ with a step $\Delta R$ in the range $0.2 \leq \Delta R \leq 0.45$, in a wavelength range $0.95 \times \lambda_{tr} \leq \lambda \leq 1.2 \times \lambda_{tr}$. In operation, the electric lamp emits colored light in the transmission mode and has a substantially color-neutral appearance in the off state.

20 Claims, 3 Drawing Sheets

ELECTRIC LAMP WITH ABSORBING AND INTERFERENCE MEDIA

The invention relates to an electric lamp comprising a light-transmitting lamp vessel in which a light source is arranged, said electric lamp comprising a light-absorbing medium exhibiting a spectral transition at a wavelength $\lambda_{tr}$ in the visible range, at least a part of the lamp vessel being provided with an interference film.

Such lamps are used in automotive applications, for example, as a (halogen) headlamp which, in operation, emits yellow light, as an amber-colored light source in indicators (also referred to as vehicle signal lamps) or as a red-colored light source in brake lights. Such electric lamps are also used for general illumination purposes. Said electric lamps are further used in traffic and direction signs, contour illumination, traffic lights, projection illumination and fiber optics illumination. Alternative embodiments of such lamps comprise lamps wherein the color temperature is increased by means of a suitable combination of a light-absorbing coating and an interference film.

An electric lamp of the type mentioned in the opening paragraph is known from the unpublished EP patent application 00204105.1 (PHNL000646). The known electric lamp comprises a light-absorbing medium exhibiting a spectral transition in the visible range in combination with a color-neutral interference film with a relatively high reflection over the larger part of the visible spectrum. The known electric lamp emits colored light in the transmission mode and has a substantially color-neutral appearance in the off state.

A drawback of the known lamp is that the luminous output of the electric lamp is relatively low.

The invention has for its object to provide a means for counteracting the above disadvantage. According to the invention, an electric lamp of the kind mentioned in the opening paragraph is for this purpose characterized in that in a wavelength range $0.95 \times \lambda_{tr} \leq \lambda \leq 1.2 \times \lambda_{tr}$, the reflection R of the interference film changes from $0.60 \leq R \leq 0.95$ to $0.40 \leq R \leq 0.65$ with a step $\Delta R$ in the range $0.2 \leq \Delta R \leq 0.45$.

By reducing the reflection level of the interference film to a (slightly) lower level in the region around and above the spectral transition at a wavelength $\lambda_{tr}$, the luminous output of the electric lamp is improved while substantially retaining the color-neutral appearance of the electric lamp in the off state. The location in the visible range of the spectral transition of the light-absorbing medium defines the color of the light output of the electrical lamp (e.g. for amber-colored light $\lambda_{tr} \sim 550$ nm and for red-colored light $\lambda_{tr} \sim 600$ nm). In the wavelength range $\lambda \leq \lambda_{tr}$, the light-absorbing medium absorbs part of the visible light. The reflection R of the interference film is relatively high in this wavelength range ($0.60 \leq R \leq 0.95$ for $\lambda$<approximately $\lambda_{tr}$). A substantial part of the light transmitted by the light-absorbing medium is reflected back by the interference film in the direction of the electric light source and passes the light-absorbing medium again. The light-absorbing medium absorbs part of this reflected light. Part of the remainder of the non-absorbed light is absorbed by the light-absorbing medium or reflected again by the interference film. The light originating from the light source thus passes through the absorbing layer more than once and also is reflected a number of times by the interference film. As a consequence of this process of multiple absorption and reflections, the thickness of the absorbing layer can be relatively thin as compared to an electric lamp comprising an absorbing film in the absence of a reflective interference film.

In the known electric lamp, the light is also reflected by the interference film in the wavelength range where the light-absorbing medium is no longer active (i.e. in the wavelength range $\lambda > \lambda_{tr}$). In this wavelength range, the light-absorbing medium no longer (substantially) absorbs. Due to the multiple reflections of light by the interference film in this wavelength range, part of the reflected light is nevertheless lost due to absorption phenomena in the electric lamp. For instance, light is absorbed and/or lost in the base or in other parts of the lamp (e.g. the light source). Such undesired effects give rise to considerable losses in the light output of the known electric lamp. Another drawback is that the undesired multiple reflections of the emitted light induce the appearance of multiple images of the light source (e.g. the filament) and/or a relatively high haze level as compared to lamps comprising an absorbing layer only.

According to the invention, the reflection level of the interference film is relatively high in the wavelength range where the light-absorbing medium is active ($0.60 \leq R \leq 0.95$ for $\lambda < \lambda_{tr}$) whereas the reflection level of the interference film is at a (slightly) lower level in the region (around and) above the spectral transition of the light-absorbing medium where the activity of the light-absorbing medium (gradually) diminishes ($0.40 \leq R \leq 0.65$ for $\lambda > \lambda_{tr}$). The step $\Delta R$ between the reflection levels where the reflection is relatively high and where the light-absorbing medium is no longer active is in the range $0.2 \leq \Delta R \leq 0.45$.

In the wavelength range above the spectral transition of the light-absorbing medium ($\lambda > \lambda_{tr}$), the reflectivity of the interference film is greatly diminished because of the relatively low reflection level of the interference film. In addition, the reduction of the effective number of reflections at the lower reflectivity leads to a decreased scattering contribution. A further advantage is that undesired absorption phenomena are also at a lower level.

It has been suggested to apply an interference film with a sharp transition (a so-called step-filter) at the spectral transition of the light-absorbing medium. The term "step filter" is to be understood to mean that the reflection spectrum exhibits a comparatively sharp spectral transition (from $R \approx 100\%$ to $R \leq 10\%$) in a comparatively narrow wavelength range ($\leq 20$ nm). The positioning of the spectral transition of this step filter is very sensitive to process variations. Small variations readily lead to a shift of the spectral transition, as a result of which the electric lamp no longer meets legal requirements. In such an electric lamp it is also necessary to apply an interference film having a comparatively high reflection in the relevant spectral range, thus necessitating a stack of a comparatively large number of optical layers. Such high reflection values are necessary to sufficiently enhance the comparatively small effect of the comparatively thin light-absorbing medium. In addition, the optical layers in the interference film of such an electric lamp must be at least substantially absorption-free in order to realize the high reflection values of the step filter. Additional drawbacks of this design are color variations as a function of the position of the electric lamp and the colored appearance of the electric lamp in the off-state which is due to the "zero" reflectivity ($R \leq 10\%$) in the part of the spectrum where the light-absorbing medium is active.

The interference film according to the invention can be realized with a relatively simple filter design with a relatively small number of optical layers. In addition, the position of the jump in reflection is not very critical.

Preferably, in the wavelength range $0.95 \times \lambda_{tr} \leq \lambda \leq 1.1 \times \lambda_{tr}$, the reflection R changes from $0.70 \leq R \leq 0.80$ to $0.45 \leq R \leq 0.55$ with a step $\Delta R$ in the range $0.2 \leq \Delta R \leq 0.3$. A very suitable interference film has a reflection level of approximately 0.75 in the wavelength range where the light-absorbing medium is active ($\lambda < \lambda_{tr}$) and a reflection level of approximately 0.5 in the wavelength range where the light-absorbing medium is no longer active ($\lambda > \lambda_{tr}$).

To explain the effect of the invention the situation is considered for a non-absorbing electric lamp provided with an interference film with multiple reflections. The fraction of the emitted light as a function of the number of reflections can be easily calculated. For m reflections of the light, the amount of light T transmitted by the interference film as a function of the level of reflection R of the interference film is given by the following formula, which is known to the skilled person:

$$T = 1 - R^{m+1}$$

Table I shows the total fraction of emitted light after m reflections as a function of the reflection level of the interference film according to the above-mentioned formula.

TABLE I

Total fraction of emitted light after m reflections as a function of the reflection level of an interference film

| Number of reflections | Total fraction of emitted light after m reflections | | |
|---|---|---|---|
| | R = 0.75 | R = 0.5 | R = 0.4 |
| 0 | 0.25 | 0.50 | 0.60 |
| 1 | 0.44 | 0.75 | 0.84 |
| 2 | 0.58 | 0.875 | 0.94 |
| 3 | 0.68 | 0.94 | 0.975 |
| 4 | 0.76 | 0.97 | 0.99 |

From Table I shows that for a traditional R=0.75 interference film after four reflections still only 76% of the light leaves the electric lamp while the same is true for an interference film with R=0.5 after only one reflection. This difference is employed advantageously in the present invention in that the mirroring effect of the interference film is only present in the wavelength range where the light-absorbing medium is active.

Assuming an absorption A somewhere in the electric lamp in combination with an interference film, the following formula can be used to calculate the transmitted light:

$$T = \frac{(1-A)(1-R)}{1-R(1-A)^2}$$

Assuming an effective absorption A of 4% in combination with an R=0.75 interference film, the transmission is approximately 78% as compared to the absorption free situation. Reducing the reflectivity to R=0.50 leads to a transmission of approximately 89%. According to this model the lumen loss decreases from 20% to approximately 10%.

Preferably, the interference film has a metallic, silvery or grayish appearance. An electric lamp provided with such an interference film can very suitably be used as an indicator lamp for automotive applications. Statutory regulations define a range, in the 1931 C.I.E. color triangle known to those skilled in the art, for the color point of the light emitted by such indicator lamps. A suitable combination of a light-absorbing medium and an interference film applied to an outside surface of the lamp vessel enables the appearance of the electric lamp to be changed. This particularly enables a distinction to be made between the appearance of the electric lamp in the off state and the color of the light emitted by the electric lamp during operation. The aim is, in particular, to provide an electric lamp which, in operation, emits a certain color, for example, a so-called amber-colored or red-colored electric lamp while, in the off state, the electric lamp has an at least substantially color-neutral appearance.

In vehicles it is desirable, for esthetical reasons, to provide indicator lamps and brake lights with a color-neutral appearance. Only when the electric lamp is activated, it shows the desired color, whereby the color point of the light emitted by the electric lamp meets statutory regulations. Moreover, in vehicles there is a tendency to accommodate amber-colored indicator lamps in the same reflector as the headlamp instead of in a separate reflector. In addition, the aim is to use luminaires in vehicles, which are provided with so-called "clear covers", i.e. an observer situated outside the vehicle can directly see the indicator lamps or brake lamps in the luminaire. For reasons of safety, it is important that, apart from a color-neutral appearance, such indicator lamps are at least substantially free of coloring in reflection at light which is (accidentally) incident on the electric lamp. If, for example, sunlight or light originating from on-coming traffic is incident on a headlamp of a vehicle comprising an indicator lamp, the appearance of said headlamp, in reflection, should be at least substantially colorless or, in reflection, said lamp should emit at least substantially no color. Otherwise, this might confuse other road users and give rise to unsafe and/or undesirable situations.

In reflection, the spectral characteristic of the electric lamp in accordance with the invention differs from the spectral characteristic in transmission. In transmission, the light emitted by the electric lamp meets statutory regulations with respect to the color point, while, in reflection the electric lamp is color-neutral, the appearance of the electric lamp being, for example, silvery or grayish. The current invention applies, in particular, to indicator lamps and brake lights of vehicles.

A synergetic effect is achieved using an electric lamp comprising a combination of a light-absorbing medium and an interference film giving the electric lamp a color-neutral appearance. In addition, the presence of the interference film may increase the stability of the light-absorbing medium in that the interference film serves as an oxygen barrier for the light-absorbing medium. Moreover, the interference film can counteract loss of color of the light-absorbing medium under the influence of external UV light, for example, by a suitable material choice, a suitably chosen band gap (for example $TiO_2$) or as a result of the fact that the interference film also reflects UV light. Experiments have shown that the adhesion of the combination of light-absorbing medium and interference film on the lamp vessel of the electric lamp is satisfactory and not, or hardly, subject to change during the service life. During the service life of the electric lamp in accordance with the invention, no visible delamination of the applied coatings is detected.

A further advantage of the application of an electric lamp comprising a combination of a light-absorbing medium and an interference film, giving the electric lamp a color-neutral appearance, is that the spectral characteristic of the light-absorbing layer is less sensitive to variations in the location of the spectral transition in the light-absorbing layer. This implies that the spectral characteristic of the light-absorbing layer is less sensitive to variations in the thickness and/or the concentration of the light-absorbing medium.

An embodiment of an electric lamp in accordance with the invention is characterized in that a wall of the lamp vessel comprises the light-absorbing medium. Light-absorbing media can be readily incorporated in the wall of the lamp vessel, which is made, for example, from glass, such as quartz glass or hard glass, or from a translucent ceramic material. In this embodiment, the interference film is preferably directly applied to a side of the wall of the lamp vessel facing away from the light source. As the light-absorbing medium is provided in the wall of the lamp vessel and the interference film, light reflected by the interference film will pass the light-absorbing.medium twice, which leads to a further improvement of the effectiveness of the absorption process. In addition, light which is reflected to and from between the interference film on both sides of the lamp vessel passes the light-absorbing medium twice at each reflection.

An alternative embodiment of the electric lamp in accordance with the invention is characterized in that the light-absorbing medium comprises a light-absorbing layer which is situated between the lamp vessel and the interference film. As the light-absorbing medium is arranged between the outside surface of the lamp vessel and the interference film, light reflected by the interference film will pass the light-absorbing medium twice, which leads to a further improvement of the effectiveness of the absorption process. In addition, light which is reflected to and fro between the interference film on both sides of the lamp vessel passes the light-absorbing layer twice at each reflection.

A thickness $t_{abs}$ of the light-absorbing layer preferably lies in the range 5 nm$\leq t_{abs} \leq$5000 nm. If the thickness of the light-absorbing layer is smaller than 5 nm, absorption hardly takes place and the intended shift of the color temperature is insufficiently achieved. If the thickness of the layer exceeds 5 μm, too much light is absorbed, which adversely affects the lumen output of the electric lamp. The desired layer thickness is also prompted by the concentration of the pigment in the light-absorbing coating.

A preferred embodiment of the electric lamp is characterized in that the light-absorbing medium has an amber-colored or red-colored transmission. Electric lamps which, in operation, emit amber-colored light can particularly suitably be used as an indicator lamp in vehicles. Electric lamps which, in operation, emit red light are particularly suitable as brake lights in vehicles.

The choice of selectively light-absorbing layers is limited by the requirement which, in accordance with the invention, is to be met by the steepness of the change of the spectral transmission of the light-absorbing medium. The choice of selectively light-absorbing layers is further limited by the thermal requirements to be met by such a light-absorbing layer. Said thermal requirements include the durability of the light-absorbing medium during the service life and the resistance to changing temperatures of the lamp vessel.

Preferably, the light-absorbing medium has an amber-colored transmission. A particularly suitable light-absorbing medium is chromophtal yellow, chemical formula $C_{22}H_6C_{18}N_4O_2$ and C.I. (constitution number) 56280. This organic dye is also referred to as "C.I.-110 yellow pigment", "C.I. pigment yellow 137" or Bis[4,5,6,7-tetrachloro-3-oxoisoindoline-1-ylidene)-1,4-phenylenediamine. An alternative light-absorbing medium having an amber-colored transmission is yellow anthraquinone, chemical formula $C_{37}H_{21}N_5O_4$ and C.I. 60645. This organic dye is also referred to as "Filester yellow 2648A" or "Filester yellow RN", chemical formula 1,1'-[(6-phenyl-1,3,5-triazine-2,4diyl)diimino]bis-.

In an alternative embodiment, the light-absorbing medium has a red-colored transmission and comprises, by way of example, "chromophtal red A2B" with C.I. 65300. Said organic dye is alternatively referred to as "pigment red 177", dianthraquinonyl red or as [1,1'-Bianthracene]-9,9',10,10'-tetrone, 4,4'-diamino-(TSCA, DSL).

An embodiment of the electric lamp in accordance with the invention is characterized in that the interference film comprises layers, comprising a first layer of a material having a comparatively low refractive index and a second layer of a material having a comparatively high refractive index, said first and second layers preferably being stacked alternately. The use of two materials simplifies the provision of the interference film. In an alternative embodiment, at least a third layer of a material is applied having a refractive index between that of the first layer and the second layer.

A preferred embodiment of the electric lamp in accordance with the invention is characterized in that the first layer of the interference film comprises predominantly silicon oxide, and in that the second layer predominantly comprises a material whose refractive index is high in comparison with a refractive index of silicon oxide. Layers of silicon oxide can be provided comparatively readily using various deposition techniques.

Preferably, the second layer of the interference film comprises a material selected from the group formed by titanium oxide, tantalum oxide, zirconium oxide, niobium oxide, hafnium oxide, silicon nitride and combinations of said materials.

Preferably, the interference films are $Nb_2O_5/SiO_2$ type films, $Ta_2O_5/SiO_2$ type films, $TiO_2/SiO_2$, $ZrO_2/SiO_2$ type films or mixtures thereof and comprise, preferably, at least 5 and at most approximately 25 layers. As a result of the comparatively small number of layers, the manufacturing costs of such an interference film are comparatively low.

The light source of the electric lamp may be an incandescent body, for example, in a halogen-containing gas, or it may be an electrode pair in an ionizable gas, for example, an inert gas with metal halides, possibly with, for example, mercury as a buffer gas. The light source may be surrounded by an innermost gastight envelope. It is alternatively possible that the outermost envelope surrounds the lamp vessel.

The interference film and the light-absorbing layer may be provided in a customary manner by means of, for example, vapor deposition (PVD: physical vapor deposition) or by (dc) (reactive) sputtering or by means of a dip-coating or spraying process or by means of LP-CVD (low-pressure chemical vapor deposition), PE-CVD (plasma-enhanced CVD) or PI-CVD (plasma impulse chemical vapor deposition). The light-absorbing layer on the outer wall of the lamp vessel is preferably applied by means of spraying. If the light-absorbing medium forms part of the wall of the lamp vessel, then this medium is generally provided in the wall in the course of the manufacture of the lamp vessel.

It has been found that the combination of absorbing medium and interference film of the electric lamp in accordance with the invention substantially retains its initial properties throughout the service life of the electric lamp.

These and further aspects of the invention will be apparent from and elucidated with reference to the embodiment(s) described hereinafter.

In the drawings.

The Figures are purely diagrammatic and not drawn true to scale. Some dimensions are particularly strongly exaggerated for reasons of clarity. Equivalent components have been given the same reference numerals as much as possible in the Figures.

Figure 1A:
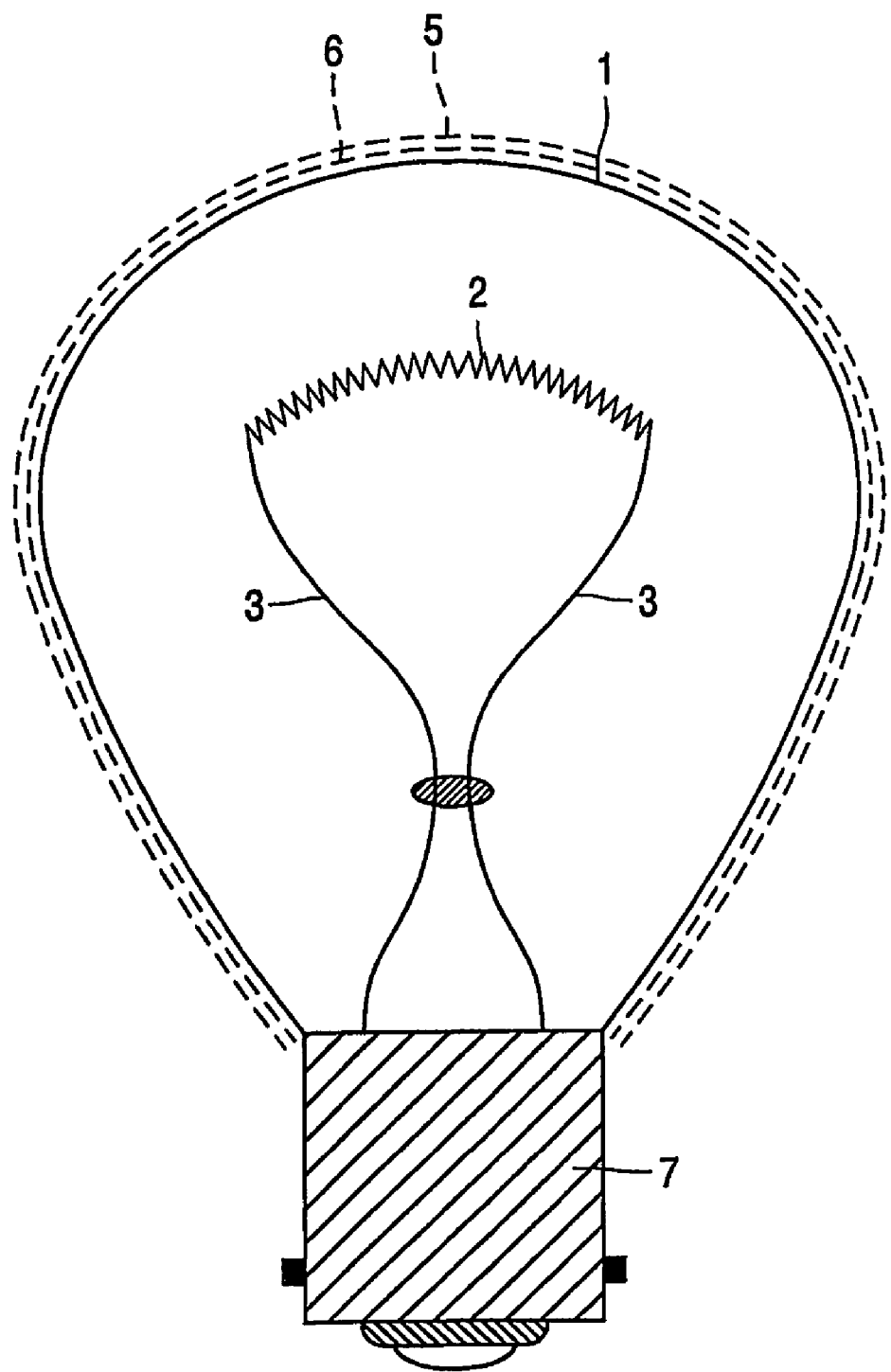
FIG. 1A is a cross-sectional view of an embodiment of the electric lamp in accordance with the invention.

FIG. 1A is a cross-sectional view of an embodiment of the electric lamp in accordance with the invention. Said electric lamp has a light-transmitting lamp vessel 1, for example, of glass, which is sealed in a gastight manner and which accommodates an electric element 2, being in the Figure a (spiral-shaped) tungsten incandescent body, which is connected to current conductors 3 which issue from the lamp vessel 1 to the exterior. The lamp shown, which is alternatively referred to as PY21W (12 volt, 21 watt), is filled with an inert gas, for example, an $Ar/N_2$ mixture, having a filling pressure of approximately 1 bar.

Figure 1B:
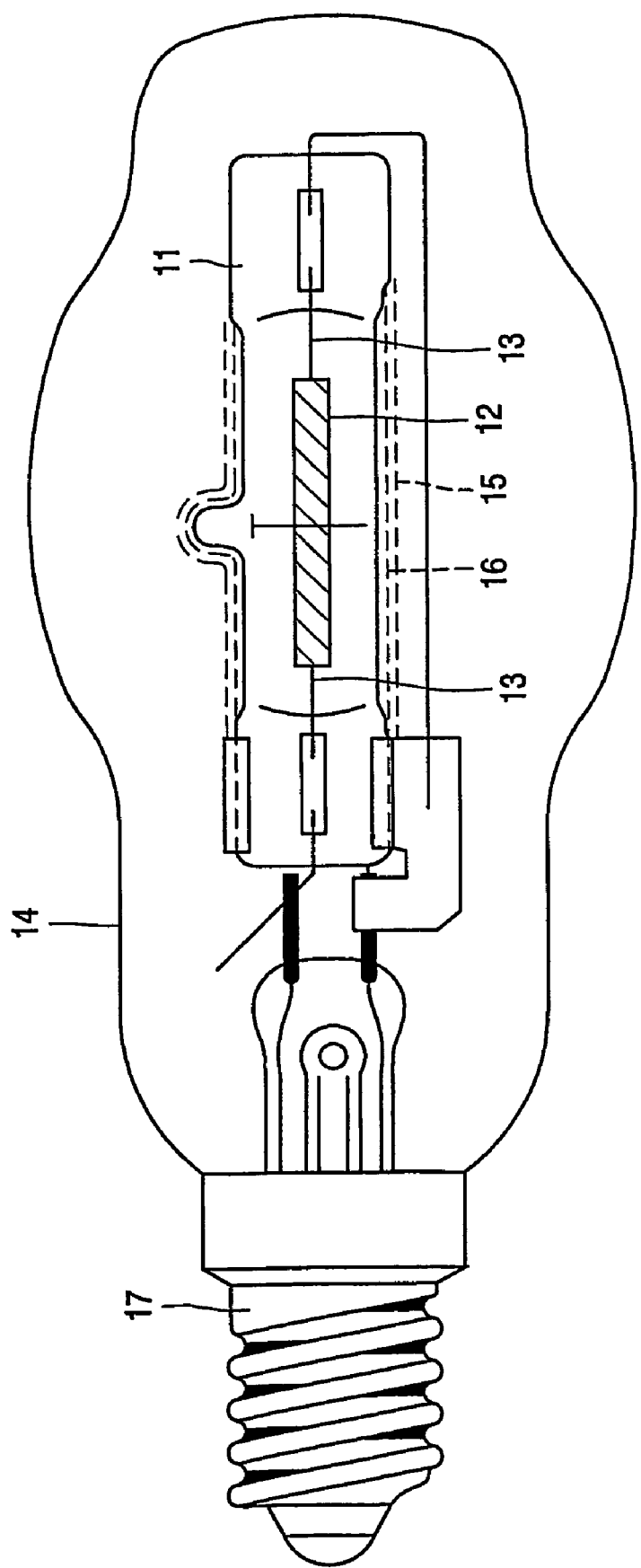
FIG. 1B is a side view of an alternative embodiment of the electric lamp in accordance with the invention.

In the embodiment of the electric lamp shown in FIG. 1A, the light-absorbing medium is provided, in the form of a light-absorbing coating 6, on an outside of the lamp vessel 1 (on a wall of the lamp vessel), and an interference film 5 is provided on said light-absorbing coating (also see FIG. 1B). The light-absorbing coating 6 comprises, in this case, for example a layer of the pigment referred to as chromophtal yellow in a layer thickness of, for example, 2 μm. An electric lamp provided with such a light-absorbing medium emits, in operation, amber-colored light. Such electric lamps are used as an indicator lamp, for example, in indicators of vehicles, and their service life is at least substantially 1200 hours. In an alternative embodiment of the coating, the light-absorbing coating 6 comprises a layer of chromophtal red A2B having a layer thickness of for example 2 μm. An electric lamp provided with such a chromophtal red A2B layer emits, in operation, red-colored light. Such electric lamps are used as brake lights in vehicles, and their service life is at least substantially 1200 hours.

In an alternative embodiment of the electric lamp shown in FIG. 1A, the wall of the lamp vessel comprises the light-absorbing medium.

FIG. 1B is a side view of an alternative embodiment of the electric incandescent lamp in accordance with the invention. Said electric lamp comprises a quartz glass lamp vessel 11 accommodating an incandescent body as the light source 12. Current conductors 13 are connected to said light source and issue from the lamp vessel 11 to the exterior. The lamp vessel 11 is filled with a halogen-containing gas, for example, hydrogen bromide. At least a part of the lamp vessel 11 is covered with a light-absorbing medium 16 in the form of a light-absorbing coating which, in this example, is formed by (an MTMS matrix-containing) chromophtal yellow or chromophtal red A2B in a layer thickness of approximately 2 μm.

In FIG. 1A, an interference film 5 is applied to the light-absorbing medium applied to the wall of the lamp vessel 1 (the "substrate"), which interference film comprises layers of alternately a layer of a material having a comparatively high refractive index, for example titanium oxide (average refractive index of $TiO_2$ approximately 2.4-2.8), niobium oxide (average refractive index of $Nb_2O_5$ approximately 2.34), tantalum oxide (average refractive index of $Ta_2O_5$ approximately 2.18) or zirconium oxide (average refractive index of $ZrO_2$ approximately 2.16), and a layer of, predominantly, silicon oxide (average refractive index approximately 1.46). The $TiO_2/SiO_2$, $Nb_2O_5/SiO_2$, $Ta_2O_5/SiO_2$ or $ZrO_2/SiO_2$ interference films preferably comprise only a small number of layers.

In the example shown in FIG. 1B, an interference film 15 is applied to the light-absorbing medium 16 and comprises layers of, alternately, predominantly zirconium oxide and silicon oxide. The $ZrO_2/SiO_2$ interference film preferably comprises only a small number of layers.

The lamp vessel 11 in FIG. 1B is mounted in an outer bulb 14, which is supported by a lamp cap 17 to which the current conductors 13 are electrically connected. The lamp shown is a 60 W mains-voltage lamp having a service life of at least substantially 2500 hours.

Experiments have shown that said interference films preferably comprise at least 5 and at most approximately 25 layers. For example, an interference film having the required spectral characteristics for an amber-colored light absorbing layer (spectral transition for amber-colored light $\lambda_{tr}$~550 nm) has a filter design comprising 18 $ZrO_2/SiO_2$ layers as given in Table II.

TABLE II

Design of an optical interference film matching the spectral transition of an amber-colored light light-absorbing medium.

| Layer number | layer material | refractive index | thickness (nm) |
|---|---|---|---|
| 1 | $SiO_2$ | 1.462 | 245.2 |
| 2 | $ZrO_2$ | 2.066 | 128.3 |
| 3 | $SiO_2$ | 1.462 | 139.1 |
| 4 | $ZrO_2$ | 2.066 | 78.7 |
| 5 | $SiO_2$ | 1.462 | 132.5 |
| 6 | $ZrO_2$ | 2.066 | 36.5 |
| 7 | $SiO_2$ | 1.462 | 109.9 |
| 8 | $ZrO_2$ | 2.066 | 91.3 |
| 9 | $SiO_2$ | 1.462 | 102.4 |
| 10 | $ZrO_2$ | 2.066 | 47.01 |
| 11 | $SiO_2$ | 1.462 | 68.2 |
| 12 | $ZrO_2$ | 2.066 | 54.5 |
| 13 | $SiO_2$ | 1.462 | 95.6 |
| 14 | $ZrO_2$ | 2.066 | 34.1 |
| 15 | $SiO_2$ | 1.462 | 106.2 |
| 16 | $ZrO_2$ | 2.066 | 37.7 |
| 17 | $SiO_2$ | 1.462 | 116.2 |
| 18 | $ZrO_2$ | 2.066 | 23.5 |
| Substrate | glass | 1.521 | |

Figure 2A:
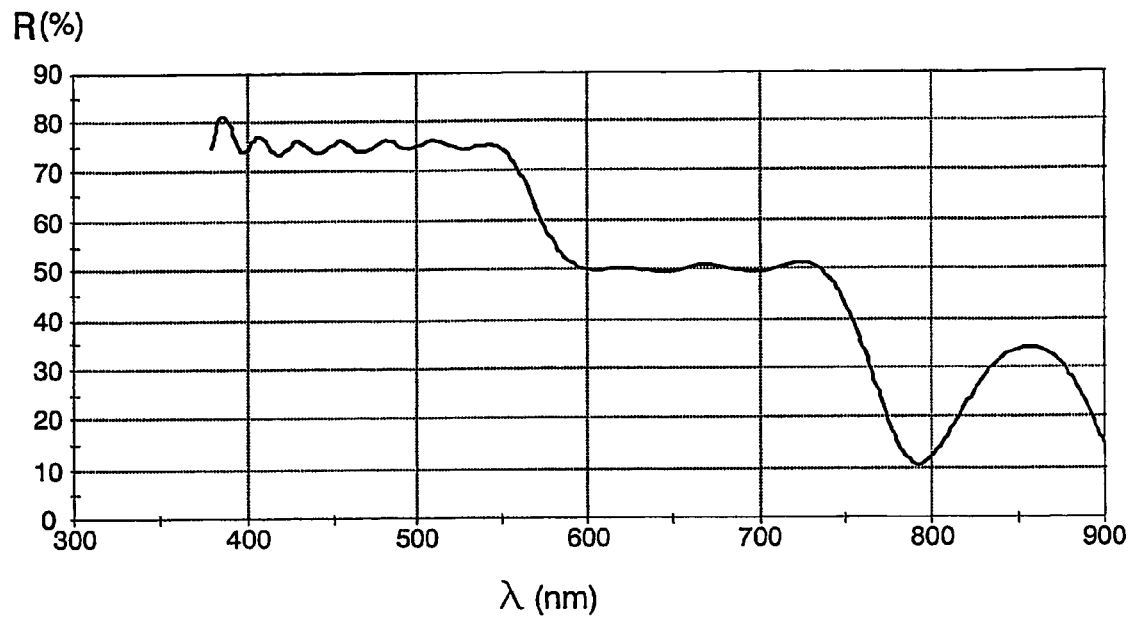
FIG. 2A shows the reflection spectrum as a function of the wavelength of a $ZrO_2/SiO_2$ interference film matching the spectral transition of an amber-colored light light-absorbing medium.

FIG. 2A shows the calculated reflection spectrum (R) as a function of the wavelength (λ in nm) of a $ZrO_2/SiO_2$ interference film matching the spectral transition of an amber-colored light light-absorbing medium. The design of the interference film is according to Table II. It can be seen from FIG. 2A that in the wavelength range from 400 nm till approximately 550 nm (range where the amber-colored light light-absorbing medium is active) the reflection of the interference film is approximately 0.75, whereas in the (visible) wavelength range above approximately 550 nm (range where the amber-colored light light-absorbing medium is no longer active), the reflection of the interference film is approximately 0.50 (ΔR≅0.25).

The interference film as depicted in FIG. 2A is close to color-neutral with a gray appearance, the color coordinates being x=0.2770, y=0.3203 and z=0.4027, whereas the color coordinates of the white point (for D65 illumination) are x=0.3127, y=0.3291 and z=0.3582. An interference film as depicted in FIG. 2A exhibits a reduced scatter level and the lumen loss in the range above approximately 550 nm (range where the light-absorbing medium is no longer active) is reduced with approximately 50%.

In an alternative embodiment, the interference film is designed to match the required spectral characteristics for a red-colored light light-absorbing layer (spectral transition for red-colored light $\lambda_{tr}$~600 nm). The filter has a design comprising 19 $ZrO_2/SiO_2$ layers as given in Table III.

TABLE III

Design of an optical interference film matching the spectral transition of a red-colored light light-absorbing medium.

| Layer number | layer material | refractive index | thickness (nm) |
|---|---|---|---|
| 1 | $SiO_2$ | 1.462 | 138.8 |
| 2 | $ZrO_2$ | 2.066 | 76.6 |
| 3 | $SiO_2$ | 1.462 | 61.9 |
| 4 | $ZrO_2$ | 2.066 | 39.5 |
| 5 | $SiO_2$ | 1.462 | 72.1 |
| 6 | $ZrO_2$ | 2.066 | 58.3 |
| 7 | $SiO_2$ | 1.462 | 83.3 |
| 8 | $ZrO_2$ | 2.066 | 57.3 |
| 9 | $SiO_2$ | 1.462 | 83.9 |
| 10 | $ZrO_2$ | 2.066 | 82.6 |
| 11 | $SiO_2$ | 1.462 | 97.8 |
| 12 | $ZrO_2$ | 2.066 | 78.2 |
| 13 | $SiO_2$ | 1.462 | 69.0 |
| 14 | $ZrO_2$ | 2.066 | 91.0 |
| 15 | $SiO_2$ | 1.462 | 130.5 |
| 16 | $ZrO_2$ | 2.066 | 124.7 |
| 17 | $SiO_2$ | 1.462 | 136.7 |
| 18 | $ZrO_2$ | 2.066 | 95.1 |
| 19 | $SiO_2$ | 1.462 | 142.4 |
| Substrate | glass | 1.521 | |

Figure 2B:
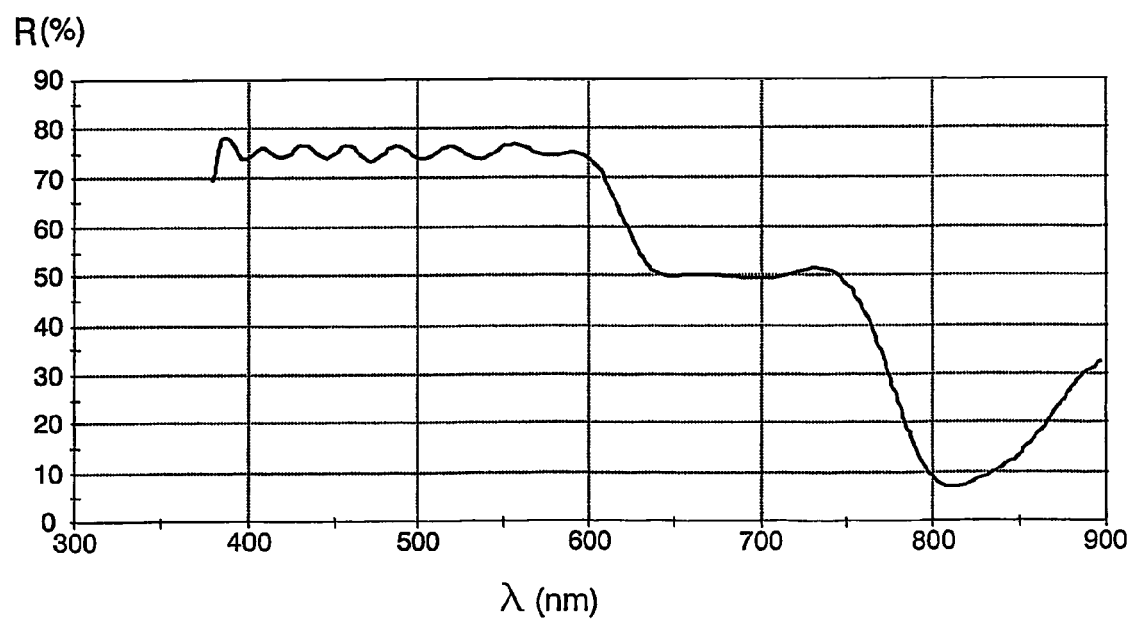
FIG. 2B shows the reflection spectrum as a function of the wavelength of a $ZrO_2/SiO_2$ interference film matching the spectral transition of a red-colored light light-absorbing medium.

FIG. 2B shows the calculated reflection spectrum (R) as a function of the wavelength ($\lambda$ in nm) of a $ZrO_2/SiO_2$ interference film matching the spectral transition of a red-colored light light-absorbing medium. The design of the interference film is according to Table III. It can be seen from FIG. 2B that in the wavelength range from 400 nm till approximately 600 nm (range where the red-colored light light-absorbing medium is active) the reflection of the interference film is approximately 0.75, whereas in the (visible) wavelength range above approximately 600 nm (range where the red-colored light light-absorbing medium is no longer active), the reflection of the interference film is approximately 0.50 ($\Delta R \cong 0.25$).

The interference film as depicted in FIG. 3A is close to color-neutral with a gray appearance, the color coordinates being x=0.2968, y=0.3305 and z=0.3726, whereas the color coordinates of the white point (for D65 illumination) are x=0.3127, y=0.3291 and z=0.3582. An interference film as depicted in FIG. 2B exhibits a reduced scatter level and the lumen loss in the range above approximately 550 nm (range where the light-absorbing medium is no longer active) is reduced with approximately 50%.

The interference film as depicted in Figure 2B is close to color-neutral with a gray appearance, the color coordinates being x=0.2968, y=0.3305and z=0.3726, whereas the color coordinates of the white point (for DGS illumination) are x=0.3127, y=0.3291 and z=0.3582. An interference film as depicted in FIG. 2B exhibits a reduced scatter level and the lumen loss in the range above approximately 550 nm (range where the light-absorbing medium is no longer active) is reduced with approximately 50%.

It will be clear that, within the scope of the invention, many varations are Possible to those skilled in the art.

The scope of protection of the invention os not limited to the examples given Herin. The invention is embodied in each novel characteristic and each combination of characteristics. References numerals in the claims do not limit the scope of protection thereof. the use of the verb "to comprise" and its conjuctions does not exclude the presence of elements other than those mentioned in the claims. The use of the article "a" or "an" in front of an element does not exclude the presence of a plurality of such elements.

The invention claimed is:

1. An electric lamp comprising a light-transmitting lamp vessel in which a light source is arranged,
    said electric lamp comprising a light-absorbing medium exhibiting a spectral transition at a wavelength $\lambda_{tr}$ in the visible range,
    at least a part of the lamp vessel being provided with an interference film, wherein in a wavelength range $0.95 \times \lambda_{tr} \leq \lambda \leq 1.2 \times \lambda_{tr}$, a reflection R of the interference film changes from $0.60 \leq R \leq 0.95$ to $0.40 \leq R \leq 0.65$ with a step $\Delta R$ in a range $0.2 \leq \Delta R \leq 0.45$, wherein the reflection R has a first reduced level and a second reduced level beginning substantially from the wavelength $\lambda_{tr}$, the first reduced level being substantially constant for approximately 100nm more than the wavelength $\lambda_{tr}$.

2. An electric lamp as claimed in claim 1, wherein in the wavelength range $0.95 \times \lambda_{tr} \leq \lambda \leq 1.1 \times \lambda_{tr}$, the reflection R changes from $0.70 \leq R \leq 0.80$ to $0.45 \leq R \leq 0.55$ with a step $\Delta R$ in the range $0.2 \leq \Delta R \leq 0.3$.

3. An electric lamp as claimed in claim 1, wherein a wall of the lamp vessel comprises the light-absorbing medium.

4. An electric lamp as claimed in claim 1, wherein the light-absorbing medium (6; 16) comprises a light-absorbing coating which is situated between the lamp vessel and the interference film.

5. An electric lamp as claimed in claim 4, wherein a thickness $t_{abs}$ of the light-absorbing layer lies in the range 5 nm$\leq t_{abs} \leq$5 µm.

6. An electric lamp as claimed in claim 1, wherein the electric lamp emits colored light, in operation, and has an at least substantially color-neutral appearance in the off state.

7. The electric lamp as claimed in claim 1, characterized in that the light-absorbing medium comprises an amber-colored or red-colored transmission.

8. The electric lamp as claimed in claim 7, wherein the light-absorbing medium having an amber-colored transmission is chromophtal yellow, chemical formula $C_{22}H_6C_{18}N_4O_2$ and C.I. 56280,
    or wherein the light-absorbing medium having an amber-colored transmission is yellow anthraquinone, chemical formula $C_{37}H_{21}N_5O_4$ and C.I. 60645.

9. An electric lamp as claimed in claim 8, wherein the light-absorbing medium having a red-colored transmission is chromophtal red, chemical formula $C_{28}H_{16}N_2O_4$ and C.I. 65300.

10. The electric lamp as claimed in claim 1, wherein the interference film comprises layers, comprising a first layer of a material having a comparatively low refractive index and a second layer of a material having a comparatively high refractive index, said first and second layers preferably being stacked alternately.

11. The electric lamp as claimed in claim 10, wherein the first layer of the interference film comprises predominantly silicon oxide, and wherein the second layer predominantly comprises a material whose refractive index is high in comparison with a refractive index of silicon oxide.

12. The electric lamp as claimed in claim 11, wherein the second layer of the interference film comprises a material selected from the group formed by titanium oxide, tantalum oxide, zirconium oxide, niobium oxide, hafnium oxide, silicon nitride and combinations of said materials.

13. A lamp comprising:
a light source;
an envelope surrounding the light source;
a light-absorbing medium formed over the envelope for absorbing light having a wavelength greater than a predetermined wavelength; and
an interference film formed over the light-absorbing medium, wherein reflection R of the interference film has a first reduced level and a second reduced level lower than the first reduced level, the first reduced level beginning substantially from a wavelength $\lambda_{tr}$, the first reduced level being substantially constant for approximately 100nm more than the wavelength $\lambda_{tr}$ and the second reduced level being substantially constant for a wavelength range greater than 50nm.

14. The lamp of claim 13, wherein the first reduced level is reduced by 0.2 to 0.45.

15. The lamp of claim 13, wherein in a wavelength range $0.95 \times \lambda_{tr} \leq \lambda \leq 1.2 \times \lambda_{tr}$, the reflection R changes from $0.6 \leq R \leq 0.95$ to $0.40 \leq R \leq 0.65$ with a step $\Delta R$ in a range $0.2 \leq \Delta R \leq 0.45$.

16. The lamp of claim 13, wherein in a wavelength range $0.95 \times \lambda_{tr} \leq \lambda \leq 1.1 \times \lambda_{tr}$, the reflection R changes from $0.70 \leq R \leq 0.80$ to $0.45 \leq R \leq 0.55$ with a step $\Delta R$ in the range $0.2 \leq \Delta R \leq 0.3$.

17. The lamp of claim 13, wherein a thickness $t_{abs}$ of the light-absorbing layer lies in the range $5 \text{ nm} \leq t_{abs} \leq 5 \text{ }\mu\text{m}$.

18. The lamp of claim 13, wherein the lamp emits colored light in operation, and has an at least substantially color-neutral appearance in an off state.

19. A lamp comprising:
a light source;
an envelope surrounding the light source;
a light-absorbing medium formed over the envelope for absorbing light having a wavelength greater than a predetermined wavelength; and
an interference film formed over the light-absorbing medium, wherein reflection R of the interference film has a first reduced level and a second reduced level lower than the first reduced level, the first reduced level beginning substantially from a wavelength $\lambda_{tr}$, the first reduced level being substantially constant for approximately 100nm more than the wavelength $\lambda_{tr}$ and the second reduced level being substantially constant for a wavelength range, wherein in a wavelength range $0.95 \times \lambda tr \leq \lambda \leq 1.2 \times \lambda tr$, the reflection R changes from $0.60 \leq R \leq 0.95$ to $0.40 \leq R \leq 0.65$ with a step $\Delta R$ in a range $0.2 \leq \Delta R \leq 0.45$.

20. A lamp comprising:
a lignt source;
an envelope surrounding the light source;
a light-absorbing medium formed over the envelope for absorbing light having a wavelength greater than a predetermined wavelength; and
an interference film formed over the light-absorbing medium, wherein reflection R of the interference film has a first reduced level and a second reduced level lower than the first reduced level, the first reduced level beginning substantially from a wavelength $\lambda_{tr}$, the first reduced level being substantially constant for approximately 100nm more than the wavelength $\lambda_{tr}$ and the second reduced level being substantially constant for a wavelength range, wherein in a wavelength range $0.95 \times \lambda_{tr} \leq \lambda \leq 1.1 \times \lambda_{tr}$, the reflection R changes from $0.70 \leq R \leq 0.80$ to $0.45 \leq R \leq 0.55$ with a step $\Delta R$ in the range $0.2 \leq \Delta R \leq 0.3$.

* * * * *